June 17, 1924.
W. F. GROENE
1,498,511
FACING ATTACHMENT FOR LATHES
Filed Sept. 30, 1922     2 Sheets-Sheet 1
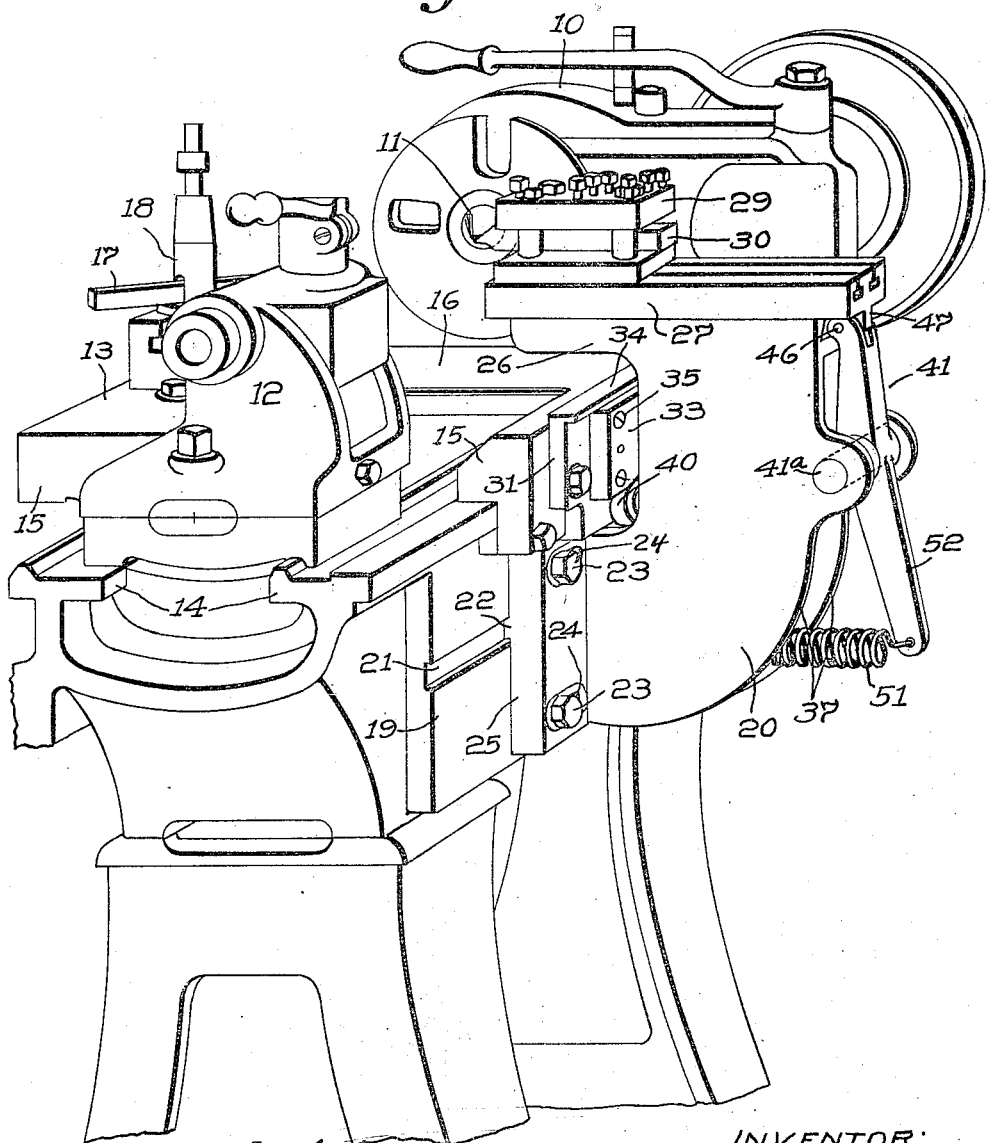
INVENTOR:
William F. Groene
BY 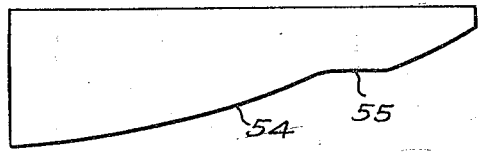
ATTORNEY June 17, 1924.

W. F. GROENE

FACING ATTACHMENT FOR LATHES

Filed Sept. 30, 1922    2 Sheets-Sheet 2

1,498,511

INVENTOR:
William F. Groene
BY Robt. P. Hains,
ATTORNEY

Patented June 17, 1924.

1,498,511

UNITED STATES PATENT OFFICE.

WILLIAM F. GROENE, OF CINCINNATI, OHIO, ASSIGNOR TO THE R. K. LE BLOND MACHINE TOOL COMPANY, OF CINCINNATI, OHIO, A CORPORATION OF DELAWARE.

FACING ATTACHMENT FOR LATHES.

Application filed September 30, 1922. Serial No. 591,546.

*To all whom it may concern:*

Be it known that I, WILLIAM F. GROENE, a citizen of the United States, residing in Cincinnati, county of Hamilton, and State of Ohio, have invented an Improvement in Facing Attachments for Lathes, of which the following description, in connection with the accompanying drawings, is a specification, like characters on the drawings representing like parts.

This invention relates to improvements in facing attachments for lathes.

In various lathe operations it may be desirable to advance a tool longitudinally of the lathe to perform one operation, and at the same time feed a second tool transversely of the lathe to perform a different operation.

It is usually desirable that the transversely operating tool be actuated in timed relation with the tool that travels longitudinally of the lathe, and means have been proposed heretofore by which movement of the lathe carriage along the lathe bed imparts a transverse feeding movement to a back facing tool, but in the constructions proposed heretofore it has not been practical to vary during a cutting operation the rate at which the facing tool is fed forward.

One important feature of the present invention, therefore, resides in a facing attachment that is operated by a profile bar, the contour of the active face of which may be formed to vary the rate of feed of the facing tool. Another important feature of the invention resides in simple and inexpensive mechanism for imparting movement from the lathe carriage to the back facing tool.

Other features of the invention and novel combination of parts in addition to the above will be hereinafter described in connection with the accompanying drawings which illustrate a good practical form thereof.

In the drawings:

Fig. 1 is a perspective view of a lathe viewed from the rear side thereof and having the facing attachment of the present invention applied thereto;

Fig. 4 is a side view of a profile bar to be described.

Figure 2:
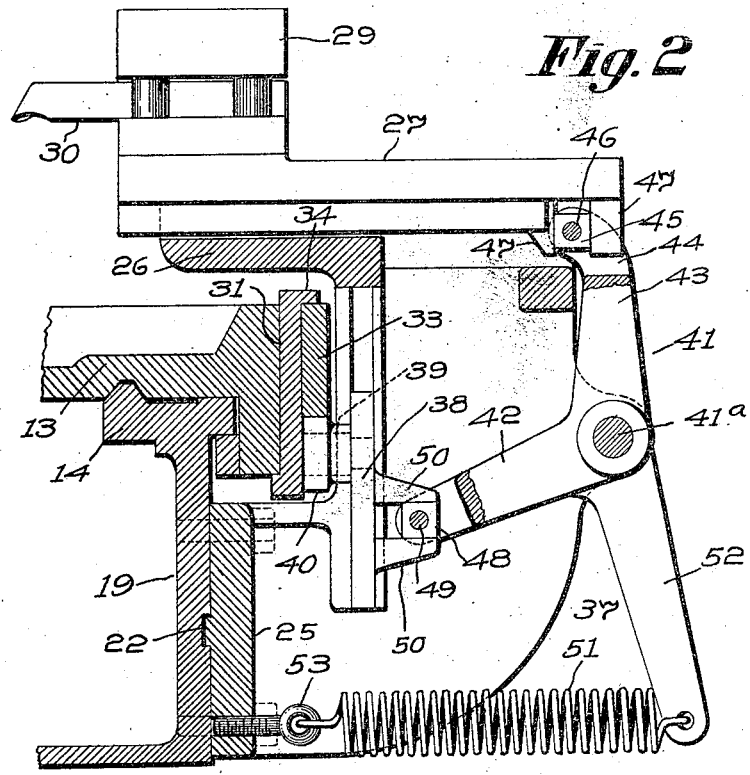
Fig. 2 is a vertical sectional view through the facing attachment and taken on the line 2—2 of Fig. 3.
Figure 3:
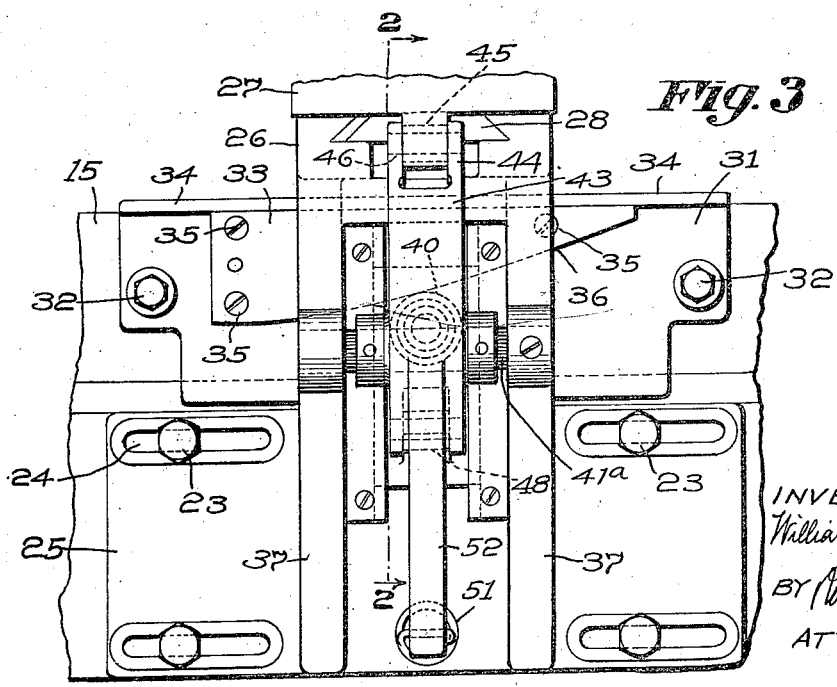
Fig. 3 is a rear view of the facing attachment shown applied to the lathe.

The lathe shown in Fig. 1 for the most part may be of any usual or preferred construction and has a head 10 provided with a live spindle 11 and a tail stock 12 provided with the usual dead spindle. The carriage 13 is mounted for sliding movement lengthwise of the lathe upon the bed 14, and this carriage as is customary, consists of side portions 15 connected by a transversely extending portion 16, and the usual turning tool 17 is supported upon the carriage by the tool post 18.

In the construction shown, the lathe has a plate 19 extending lengthwise of the rear side of the lathe and to this plate is secured the bracket 20. The plate 19 preferably is provided with a slot 21 extending lengthwise thereof, and the bracket 20 may have a key 22 that extends into the slot 21, the arrangement being such that the bracket 20 may be adjusted lengthwise of the lathe and may be rigidly secured in any desired position of adjustment by bolts 23 extending through elongated slots 24 formed in longitudinally extending side portions 25 of the bracket. The bracket 20 has an upwardly extending portion, and at the upper end thereof is formed a head 26 which may extend inwardly over a portion of the carriage 13, as shown. Upon the head 26 is slidably mounted a tool carrier 27 which is supported by the bracket 20 for movement transversely of the lathe toward and from the axis of the work supporting centers, and the tool carrier 27 may have a dove-tailed portion 28 which slidably engages the head 26. Upon the tool carrier 27 is mounted clamping means 29 which support the facing tool 30.

As stated one important feature of the present invention resides in a profile bar which serves to impart movement to the tool carrier 27 as the carriage 13 travels longitudinally of the lathe, and which may be so constructed that the rate at which the facing tool is fed forward will be varied during the cutting operation. Desirable means to this end will now be described.

In the construction shown, the rear side member 15 of the lathe carriage has a plate 31 secured thereto by bolts 32 and upon this plate is mounted the profile bar 33. The upper edge of the plate 31 preferably has a laterally extending lip 34 against which the upper edge of the profile bar may seat and this bar may be secured to the plate 31 by screws 35. In the present case, the profile bar 33 has a curved lower face 36 against which a roller to be described rests.

The bracket 20 which is secured to the rear face of the lathe preferably has the spaced upwardly extending walls 37 and in the spaces between these walls is mounted a slide 38 which is supported by the bracket 20 for vertical movement. Extending from one face of the slide 38 is a stud 39 upon which is rotatably mounted a roller 40 which engages the cam face 36 of the profile bar. Movement of the slide 38 is imparted to the tool carrier 27 by a rocking lever 41. This lever preferably is mounted on a shaft 41$^a$ the ends of which are supported by ears formed upon the spaced walls 37, and the rocking lever 41 has one arm 42 that extends towards the slide 38 and a second arm 43 which extends towards the tool carrier 27.

The arms 42 and 43 may be operatively connected to the slides 38 and 27 by various means which will permit the ends of these arms to move relatively to the respective slides, and in the construction shown the arm 43 is bifurcated at its end, as shown, to form the spaced fingers 44 between which is mounted a block 45 which is secured to the fingers 44 by a pin 46. The block 45, as best shown in Fig. 2, is mounted between the spaced lugs 47 extending downwardly from the rear end of the tool carrier 27. The arm 42 may be similarly bifurcated at its outer end to receive a block 48, secured thereto by a pin 49, and this block may slide between the spaced lugs 50 which are secured to the slide 38.

The operation of the construction described is such that as the carriage 13 moves along the lathe toward the head thereof, the profile bar 33 secured thereto will force the roller 40 and the slide 38 downwardly due to the action of the cam face 36 upon this roller. Downward movement of the slide 38 will rock the lever 41 in a contra-clockwise direction to move the tool carrier 27 inwardly towards the work supported by the lathe. In the present case, movement of the tool carrier 27 outwardly away from the work is effected by a spring 51, one end of which is secured to a downwardly extending arm 52 of the lever 41, and the other end of the spring may be secured to the lower portion of the bracket 20 by a bolt 53. The spring 51 will serve to hold the roller 40 in engagement with the cam face 36 of the profile bar and as the carriage 13 is moved rearwardly the lever 41 will be permitted to rock in a clockwise direction under the action of the spring 51 to move the tool carrier outwardly.

The active face 36 of the profile bar may be given any desired configuration, so that the rate at which the facing tool 30 will be fed inwardly towards the work may be varied as desired by varying the contour of the cam face 36. In some cases it may be desirable to give the profile bar 33 such a contour that the facing tool 30 will be moved inwardly to a desired extent and will then dwell in a predetermined position, and this may be accomplished by constructing the profile bar as shown in Fig. 4, wherein the cam face 54 has a flattened portion 55 against which the roller 40 may travel without forcing the facing tool inwardly. When it is desired to change the rate at which the tool carrier will be fed inwardly, this may be readily accomplished by removing the plate 31 which is bolted to the rear face of the carriage 13 so that a profile bar having an active face of a different contour from the bar previously used may be secured to the plate 31, whereupon this plate may be again secured to the lathe carriage. As a result of this construction the contour of the profile bar 33 may be varied to operate the tool carrier 27 at any desired rate of speed.

What is claimed is:

1. In a lathe, the combination of a tool carriage movable longitudinally on the lathe bed, a bracket secured to the rear side of the lathe bed and extending upwardly therefrom, a facing tool carrier mounted on the upper portion of the bracket for sliding movement transversely of the lathe, a rocking lever mounted upon said bracket and having an upwardly extending arm that is operatively connected to the facing tool carrier, a profile bar secured to the rear wall of the carriage and movable therewith lengthwise of the lathe, and means engaging the profile bar and actuated thereby to impart a rocking movement to said lever to move the carrier transversely of the lathe as the carriage moves along the lathe bed.

2. In a lathe, the combination of a tool carriage movable longitudinally on the lathe bed, a bracket adjustably secured to the lathe bed and provided with means for securing it rigidly in different positions of adjustment longitudinally of the lathe bed, a facing tool carrier mounted on the bracket for sliding movement transversely of the lathe, and means for utilizing the movement of the carriage lengthwise of the lathe to feed the carrier transversely of the lathe, comprising a profile bar secured to the carriage, a rocking lever mounted upon said bracket and having an arm that is operatively connected to the facing tool carrier, means engaging the profile bar and actuated thereby to rock said lever in one direction, and yielding means acting upon said lever to rock it in the opposite direction.

3. In a lathe, the combination of a tool carriage movable longitudinally on the lathe bed, a bracket supported independent of the carriage, a facing tool carrier mounted upon the bracket for sliding movement transversely of the lathe, a profile bar connected to the carriage and movable therewith, a rocking lever supported by the bracket and connected to the carrier to move the carrier transversely of the lathe, a slide supported by the bracket in position to be actuated by the travel of the profile bar longitudinally of the lathe, a connection between the slide and lever to rock the lever and feed the carrier transversely of the lathe toward the work, and yielding means for moving the lever and carrier in the opposite direction.

4. In a lathe, the combination of a tool carriage movable longitudinally on the lathe bed, a bracket supported independently of the carriage, a facing tool carrier mounted upon the bracket for sliding movement transversely of the lathe, a profile bar secured to the carriage and movable therewith, a rocking lever supported by the bracket and having an upwardly extending arm, a block pivotally connected to said arm and engaging the carrier to impart movement of the lever to the carrier, a second arm upon said lever extending toward the profile bar, and means engaging the active face of the profile bar and actuated by movement of the profile bar lengthwise of the lathe to rock the lever and move the carrier transversely of the lathe.

5. In a lathe, the combination of a tool carriage movable longitudinally on the lathe bed, a bracket supported independently of the carriage, a facing tool carrier mounted upon the bracket for sliding movement transversely of the lathe, a profile bar secured to the carriage and movable therewith, a rocking lever supported by the bracket and having projecting arms, means for connecting one arm to the carrier to actuate the carrier, means connected to a second arm and actuated by the travel of the profile bar to rock the lever in a direction to advance the carrier, and yielding means upon a third arm of the lever to retract the carrier.

6. In a lathe, the combination of the bed, means for centering and rotating a blank, a carriage for supporting a turning tool and advancing it along the longitudinal surface of the blank, a bracket supported independently of the carriage, a tool carrier supported by the bracket for movement transversely of the lathe toward and from the blank, a profile bar carried by the carriage, a slide supported independently of the carriage and actuated by the profile bar upon movement of the carriage along the bed, and a lever for imparting movement of said slide to the tool carrier.

7. In a lathe, the combination of a bed, means for centering and rotating a blank, a carriage for supporting a turning tool to act along the longitudinal surface of the blank, a facing tool carrier mounted independent of the carriage for movement toward and from the axis of the blank, a profile bar connected to the carriage for movement therewith and having its under surface provided with a profile to determine the movement of the facing tool carrier towards the work, a lever fulcrumed independent of the facing tool carrier and connected thereto and having one arm thereof operated by the under profile surface of the profile bar, and means acting upon the lever to maintain said arm in operative relation with the under profile surface of the profile bar as the carriage is moved in one direction and to return the facing tool carrier to initial position when the carriage is moved in the opposite direction.

8. In a lathe, the combination of a bed, means for centering and rotating a blank, a carriage for supporting a turning tool to act along the longitudinal surface of the blank, a facing tool carrier mounted independent of the carriage for movement toward and from the axis of the blank, a profile bar connected to the carriage for movement therewith and having its under surface provided with a profile to determine the movement of the facing tool carrier toward the work, a lever fulcrumed independent of the facing tool carrier and connected thereto, and having one arm thereof operated by the under profile surface of the profile bar, and a spring connected to the lever and acting normally to maintain the lever in operative relation with the profile bar as the carriage is moved in one direction and to return the lever and facing tool carrier to initial position as the carriage is moved in the opposite direction.

9. In a lathe, the combination of a bed, means for centering and turning a blank, a carriage supporting a turning tool and advancing it along the longitudinal surface of the blank, a bracket supported by the bed, a facing tool carrier supported by the bracket for movement transversely of the lathe towards and from the axis of the blank, a profile bar mounted on the carriage, a slide mounted for vertical movement and actuated by the profile bar, and a lever connected to the slide and also connected to the facing tool carrier for imparting movements of the slide to the facing tool carrier.

10. In a lathe, the combination of a bed, means for centering and turning a blank, a carriage for supporting a turning tool and advancing it along the longitudinal surface of the blank, a bracket supported by the bed, a facing tool carrier supported by the bracket for movement transversely of the lathe towards and from the axis of the blank, a profile bar mounted on the carriage, a slide mounted for vertical movement and actuated by the profile bar, and a lever connected to the slide and also connected to the facing tool carrier for imparting movement of the slide to the facing tool carrier, and a spring acting upon the lever to return the facing tool carrier, the slide, and lever to initial position.

In testimony whereof, I have signed my name to this specification.

WILLIAM F. GROENE.